(12) United States Patent
Wheeler et al.

(10) Patent No.: US 7,737,973 B2
(45) Date of Patent: Jun. 15, 2010

(54) DETERMINING APPEARANCE OF POINTS IN POINT CLOUD BASED ON NORMAL VECTORS OF POINTS

(75) Inventors: Mark Damon Wheeler, San Ramon, CA (US); Jonathan Apollo Kung, San Francisco, CA (US); Richard William Bukowski, Orinda, CA (US)

(73) Assignee: Leica Geosystems AG, Heerbrugg (CH)

( * ) Notice: Subject to any disclaimer, the term of this patent is extended or adjusted under 35 U.S.C. 154(b) by 327 days.

(21) Appl. No.: 11/415,589

(22) Filed: May 1, 2006

(65) Prior Publication Data

US 2007/0097120 A1   May 3, 2007

Related U.S. Application Data

(60) Provisional application No. 60/731,975, filed on Oct. 31, 2005.

(51) Int. Cl.
*G06T 15/50* (2006.01)
*G06T 15/00* (2006.01)
*G06T 17/00* (2006.01)

(52) U.S. Cl. .................. 345/426; 345/419; 345/420

(58) Field of Classification Search ............... None
See application file for complete search history.

(56) References Cited

U.S. PATENT DOCUMENTS 5,966,134 A * 10/1999 Arias ..................... 345/589
2004/0051711 A1 * 3/2004 Dimsdale et al. ........... 345/419
2005/0231504 A1 * 10/2005 Heng et al. ............... 345/420
2006/0119601 A1 * 6/2006 Finlayson et al. .......... 345/427

OTHER PUBLICATIONS

J. Diepstraten, D. Weiskopf, and T. Ertl. Transparency in interactive technical illustrations. In Computer Graphics Forum, vol. 21, 2002. http://citeseer.ist.psu.edu/article/diepstraten02transparency.html.*
Marc Nienhaus , Jürgen Döllner, Blueprints: illustrating architecture and technical parts using hardware-accelerated non-photorealistic rendering, Proceedings of the 2004 conference on Graphics interface, May 17-19, 2004, London, Ontario, Canada.*
Brett Wilson, Eric B. Lum, Kwan-Liu Ma, Interactive Multi-volume Visualization, Lecture Notes In Computer Science; vol. 2330 archive, Proceedings of the International Conference on Computational Science—Part II table of contents, 2002.*

(Continued)

*Primary Examiner*—Daniel F Hajnik
(74) *Attorney, Agent, or Firm*—Workman Nydegger

(57) ABSTRACT

A method relating to a point cloud includes defining a line of sight of a point cloud on a display of a computer, estimating a normal vector for at least one point of the plurality of points, and determining the appearance on the display of at least one point of the plurality of points based on the step of estimating a normal vector. One can use the computer to manipulate the point cloud to display a selected view of the scene and calculate the angle between the normal vector of the at least one point and a line of sight. The step of determining the appearance can include determining the transparency, color or size of the point on the display according to the angle between the normal vector and the line of sight.

17 Claims, 7 Drawing Sheets

OTHER PUBLICATIONS

Zakaria, Nordin; Seidel, Hans-Peter "Interactive stylized silhouette for point-sampled geometry" Computer graphics and interactive techniques in Australasia and South East Asia: Proceedings of the 2nd international conference; Jun. 15-18, 2004.*

A. Lu, C.J. Morris, J. Taylor, D.S. Ebert, C. Hansen, P. Rheingans and M. Hartner, "Illustrative Interactive Stipple Rendering," IEEE Trans. Visualization and Computer Graphics, vol. 9, No. 2, pp. 127-138, Apr.-Jun. 2003.*

Kindlmann, G., Whitaker, R., Tasdizen, T., and Moller, T. 2003. Curvature-Based Transfer Functions for Direct Volume Rendering: Methods and Applications. In Proceedings of the 14th IEEE Visualization 2003 (Vis'03) (Oct. 22-24, 2003). IEEE Visualization. IEEE Computer Society, Washington, DC.*

Winnemöller, H. and Bangay, S. 2003. Rendering optimisations for stylised sketching. In Proceedings of the 2nd international Conference on Computer Graphics, Virtual Reality, Visualisation and interaction in Africa (Cape Town, South Africa, Feb. 3-5, 2003). AFRIGRAPH '03. ACM, New York, NY, 117-122.*

*An Automatic Data Segmentation Method for 3D Measured Data Points*, Tien-Tung Chung et al., Dept. of Mechanical Engineering, National Taiwan University (8 pages).

*Realworks Survey Software Technical Notes*, Trimble Navigation Limited 2005 (8 pages).

*Three-Dimensional Object Representation and Recognition Based on Surface Normal Images*, Jong Hoon Park et al., Pattern Recognition vol. 26, No. 6, pp. 913, 931. 1993 (9 pages).

*Free-form Surface Reconstruction for Machine Vision Rapid Prototyping*, Colin Bradley et al., Optical Engineering, Sep. 1993. vol. 32 No. 9 pp. 2191-2200 (10 pages).

* cited by examiner

DETERMINING APPEARANCE OF POINTS IN POINT CLOUD BASED ON NORMAL VECTORS OF POINTS

CROSS REFERENCE TO RELATED APPLICATIONS

This application claims the benefit of provisional patent application No. 60/731,975 filed on Oct. 31, 2005.

BACKGROUND OF THE INVENTION

The present invention relates generally to systems that document the geometry and other attributes of objects in three dimensions and, specifically, to a system that employs a scanning lidar (range finding laser) to quickly and accurately sense the position in three-dimensional space of selected points on the surface of an object to generate a point cloud model which represents the sensed positions of the selected points. The point cloud model may be transformed into a further model usable by computer-aided design (CAD) tools, including conventional CAD tools.

Mapping the geometry (shape, dimensions and location) and other attributes (e.g., color, texture and reflectance intensity) of complex real objects (whether small components such as small mechanical parts or large objects such as buildings and sites) has conventionally been a tedious and time-consuming process that has been performed manually. In addition, transforming these measurements into drawings or computer models required manual drafting or input into a CAD system for the production of the drawing or computer models.

In the building industry, conventional methods of mapping a structure requires three basic steps: field data gathering, data reduction and preparation and drafting and CAD. The gathering step is performed by a team of surveyors who manually measure and record dimensions of pertinent components of the structure such as walls, ceilings, beams, columns, doors, windows, fixtures, pipes, conduits and equipment. The surveyors attempt to determine the geometry of the components as well as the relative location of the components in the structure and record the geometry and relative location in a field notebook. That information is then organized and reduced to tables and organized sketches. A CAD operator or drafter uses these tables to generate final drawings or models.

This process is labor intensive, time consuming, and error prone. In addition, using traditional surveying methods, the number of points which can actually be measured is very limited, due to the high cost of acquiring each point in terms of time and effort. Furthermore, if it is desired to acquire color, texture and other attribute information, additional field notes must be taken (e.g., still photographs and video).

SUMMARY OF THE INVENTION

An aspect of the invention relating to a point cloud includes defining a line of sight of a point cloud, estimating a normal vector for at least one point in the point cloud, and determining the appearance of at least one point based on the step of estimating a normal vector. The point cloud includes a plurality of points that together represent a scene. One can use a computer to manipulate the point cloud to display a selected view of the scene and calculate the angle between the normal vector of the at least one point and a line of sight. The steps disclosed herein may also be embodied as computer-executable instructions stored in a computer-readable medium. The step of determining the appearance can include determining the opacity on a display according to the angle between the normal vector and the line of sight. Or, one can use the computer to determine color on the display according to the angle between the normal vector and the line of sight.

DETAILED DESCRIPTION OF THE PREFERRED EMBODIMENTS

Figure 11:
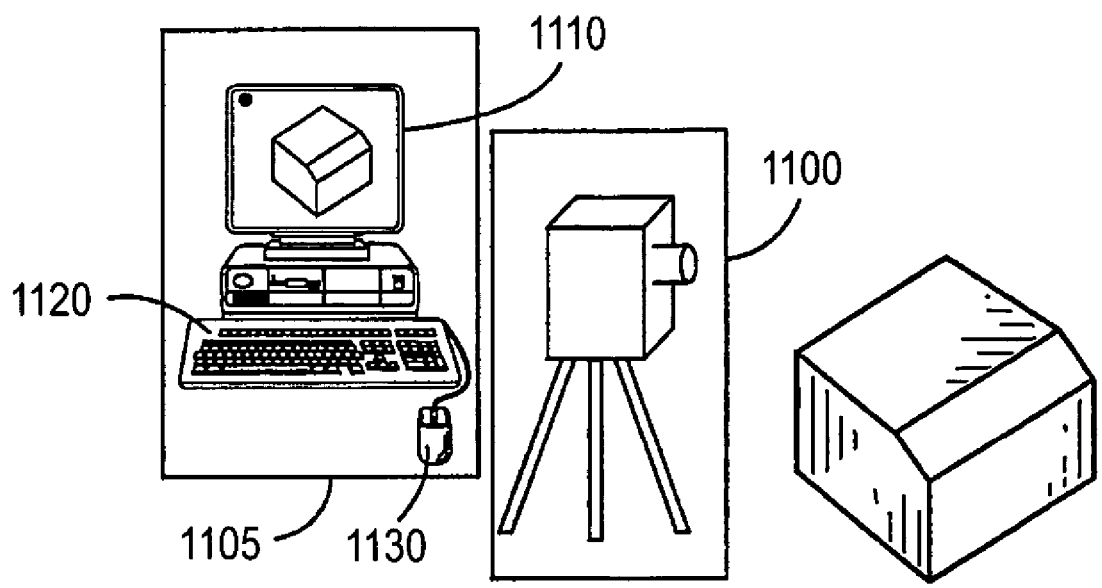
FIG. 11 shows a conventional set up for scanning a space and displaying a resultant point cloud.

The preferred embodiments relate generally to software for manipulating and viewing a cloud of points collected by a laser scanner such as the laser scanner disclosed in U.S. Pat. No. 6,734,849, which is incorporated herein by reference. Generally speaking, the methods and apparatus according to the preferred embodiments use the laser scanner 1100 shown in FIG. 11 to collect points to form a point cloud in a well-known way. A computer 1105 can display the points as a point cloud on a display, including such devices as a monitor, a projection screen, and stereo glasses. By displaying the points, the computer 1105 is assigning pixel values based on instructions from software according to well-known principles. Each point in the point cloud represents the distance in a real scene from a point on a surface of an object in the scene to the laser scanner that collected the point.

According to a preferred embodiment, the user has the option to change the appearance of points being displayed according to the relationship between the line of sight of the points and the normal vectors of the points. In other words, the computer 1105 assigns pixel values in such a way to display points according to predetermined criteria, which will be described in more detail below. In this way, a user can control the appearance of the image so that the outlines of objects are highlighted whereby the object is shown in the manner of a mechanical or architectural drawing. Alternatively, the user can control the appearance of the image so that points representing occluding objects, which are situated in front of an occluded object, appear differently, thus highlighting the occluded object.

An important prerequisite to controlling the appearance of an image is estimating the normal vector for the points composing the point cloud. Preferably, the computer according to the preferred embodiments estimates the normal vector for each point using a well-known process, which happens to be implemented in the CYCLONE-brand software sold by Leica Geosystems HDS, LLC of San Ramon, Calif. Briefly, the normal-estimation algorithm determines the nearest neighbor for each point and estimates the normal for the plane defined by the point and its nearest neighbors. The plane's normal is the point's normal. This method of estimating normal vectors for points is preferred because it does not require the computationally expensive process of rendering an object or calculating surface contours.

There are various, other well-known ways of determining the normal vector of a point in a point cloud. For example, a paper entitled *An Automatic Data Segmentation Method For 3d Measured Data Points* by Tien-Tung Chung and Chao-Yaug Liao See, at pp. 2-3, describes a method of finding the normal of a point by drawing triangles among the point and its nearest neighbors. Then, Chung and Liao use the cross product of two vectors of two adjacent neighbors from the point to calculate the normal vector of each triangle plane. Therefore, the normal vector can be calculated by dividing the sum of triangle plane normal vectors by the number of neighbors.

Alternatively, the surface can be first modeled and then the normals determined from the mathematical model using well-known techniques. Colin Bradley and Geoffrey W. Vickers, in an article entitled *Free-form Surface Reconstruction for Machine Vision Rapid Prototyping* appearing in the September 1993 volume of the periodical *Optical Engineering*, describe several techniques for modeling a surface based on a point cloud. Jong Hoon Park, Tae Gyu Chang and Jong Soo Choi, in a June 1993 volume of the periodical *Pattern Recognition*, describe a concept for determining normal vectors for curved surfaces.

Two well-known factors substantially determine the error of the direction of the estimated normals. One is the method used to calculate the normal and the other is the resolution of the scan. Calculating the normal by building a mathematical model yields a high-quality normal estimate, while finding and using the nearest points of any given point to estimate the normal of the point yields a lower-quality estimate. With respect to resolution, higher scan resolutions (meaning more points collected by the laser scanner per area) yield higher-quality normal estimations.

Once the normal vector for each point is estimated, the computer according to the preferred embodiments allows a user to highlight points with some characteristic (such as transparency or color) that varies according to a predetermined function, which is preferably a power function. In each of the preferred embodiments, the predetermined function is preferably a function of the dot product of the normal vector of a point and the line of sight.

Briefly, in one aspect of the preferred embodiments, as the point cloud is rotated in a display by a user, the points will be made increasingly opaque, or the points will change color or size, according to the predetermined function. In another aspect, points are highlighted in a static display, such as a printout. The method of the preferred embodiments even admits of highlighting points in a point cloud only by a machine without a recognizable display, wherein highlighting certain points in the point cloud is a step prior to or as part of a machine analysis, such as feature extraction.

In a first embodiment illustrated in FIG. 2, the transparency of a point is preferably determined as follows:

$$x = n \cdot v \quad \text{(Eq. 1)}$$

and $$t = |x|^a, \quad \text{(Eq. 2)}$$

where x is the value of the dot product of the normal vector n and view direction (also known as the line of sight) v, and t is the transparency value which goes from 0.0 (opaque) to 1.0 (invisible/totally transparent). The normal vector n and the line of sight v are unit vectors. As will be discussed in more detail, t need not represent transparency, but could instead represent other appearance characteristics, such as color or point size. The line of sight v and how it may be calculated is also discussed in more detail below.

Figure 1:
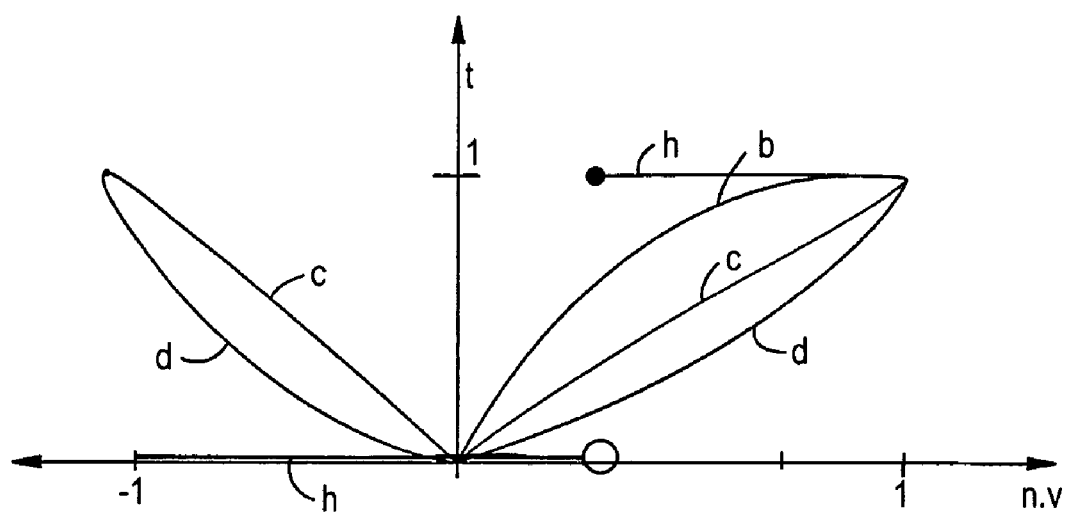
FIG. 1 is a plot of alternative predetermined functions for use in the first embodiment.

The power a is preferably about 0.4 because that value gradually changes the appearance of points in the point cloud. That value also adequately highlights the edges of objects represented in a point cloud. FIG. 1 graphically plots as line b the transparency values t versus the x value (which is equivalent to n·v).

Other values may be chosen based on such factors as the quality of the data, the nature of the objects represented in the point cloud, and user preference. For example, FIG. 1 depicts a linear relationship, where t=x=n·v, as line c. Line d plots a value 2.0 for a.

Other predetermined functions, besides the simple power function according to Eqs. 1 and 2, are contemplated. For example, the predetermined function could be a polynomial. The predetermined function could also be a step function. An example of a step function is t=0 if x<ϵ, 1.0 otherwise (using the definitions of t and x discussed above). An acceptable value of ϵ is 0.3, although of course other values could be used. FIG. 1 shows such a step function as line h.

The foregoing examples of predetermined functions are illustrations that do not limit the scope of the invention. Indeed, the few examples illustrate the variety of potential predetermined functions that could be used to adjust the appearance of points based on their normal vectors. In addition, the functions plotted in FIG. 1 are not to scale; they merely exemplify a few of the potential predetermined functions. Therefore, the plotted functions can be stretched or compressed or displaced along the x or t axis without materially affecting the invention according to the embodiment.

A more tangible example will illustrate the preferred embodiment, which uses Eqs. 1 and 2 as the predetermined function. FIG. 2 schematically depicts a cylindrical object 200. The cross-section of the cylindrical object 200 in FIG. 2 is composed of, for example, twelve points, each of which has a normal vector associated with it. For simplicity, consider the four points in the upper-left quadrant, which have normal vectors 201, 202, 204 and 206 associated with them. A line of sight 208 is, in this example, in the same plane as the points and is antiparallel to the normal vector 201. The dot product of the normal vector 201 and the line of sight 208 is −1. The absolute value of the dot product is 1, and taking 1 to the power of 0.4 yields a transparency value of 1. As a result, the point with normal vector 201 is totally transparent. Likewise, if the normal vector 202 is associated with the line of sight 208 by an angle of 135°, the transparency value for that point is 0.87.

Figure 2:
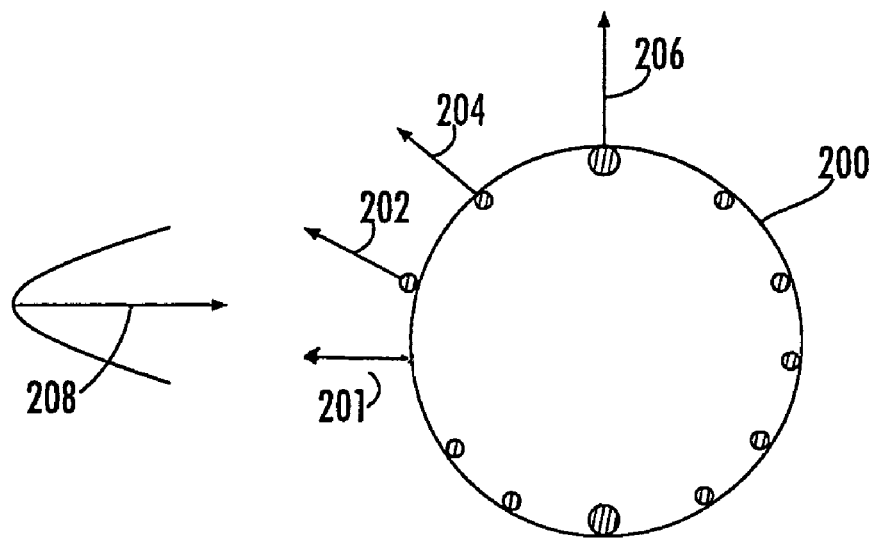
FIG. 2 is a schematic plan view of a plurality of points composing a representation of a cylinder in a point cloud.

The transparency values of the twelve points shown in FIG. 2, as calculated according to Eqs. 1 and 2, will decrease as the normal of the point approaches a perpendicular relationship with the line of sight. This is depicted in FIG. 2 by the size of the points. Large points represent opaque points, and more transparent points are represented by smaller points. The point with normal vector 201 is transparent and thus not visible in FIG. 2.

Figure 3:
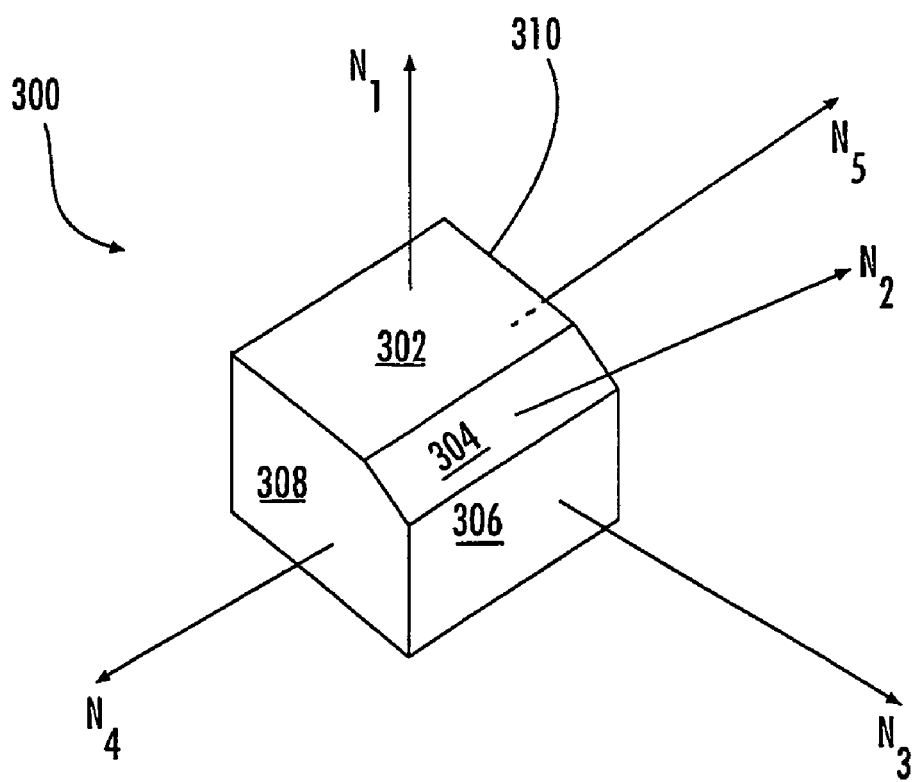
FIG. 3 shows an example object to be scanned by a laser scanner according to a first embodiment of the invention.

FIG. 3 illustrates an example of one preferred embodiment. An object 300 includes a plurality of surfaces and, in this case, each surface is a plane and therefore has only one normal vector. The planes and their associated vectors of the sample object shown in FIG. 3 are described in the following table:

TABLE 1

| Plane in FIG. 3 | which associated with normal vector | which has the following description |
| --- | --- | --- |
| 302 | N1 | which is vertical |
| 304 | N2 | which extends at an acute angle from surface normal N1 |
| 306 | N3 | which extends from the front of the object and is perpendicular to N1 |
| 308 | N4 | which extends from one side surface of the object and is perpendicular to N1 and N3 |
| 310 | N5 | which extends from another side surface of the object, is anti-parallel to N4 and is perpendicular to N1 and N3 |

The object 300 is scanned by the laser scanner, such as the laser scanner described in U.S. Pat. No. 6,734,849 (which, as previously mentioned, is incorporated herein by reference). For this example, suppose that the object 300 is scanned twice from two different perspectives, and the surfaces described in Table 1 were visible to the scanner. The two laser scans result in two clouds of points, which are coregistered in a well-known way to form one set of points.

Figure 4:
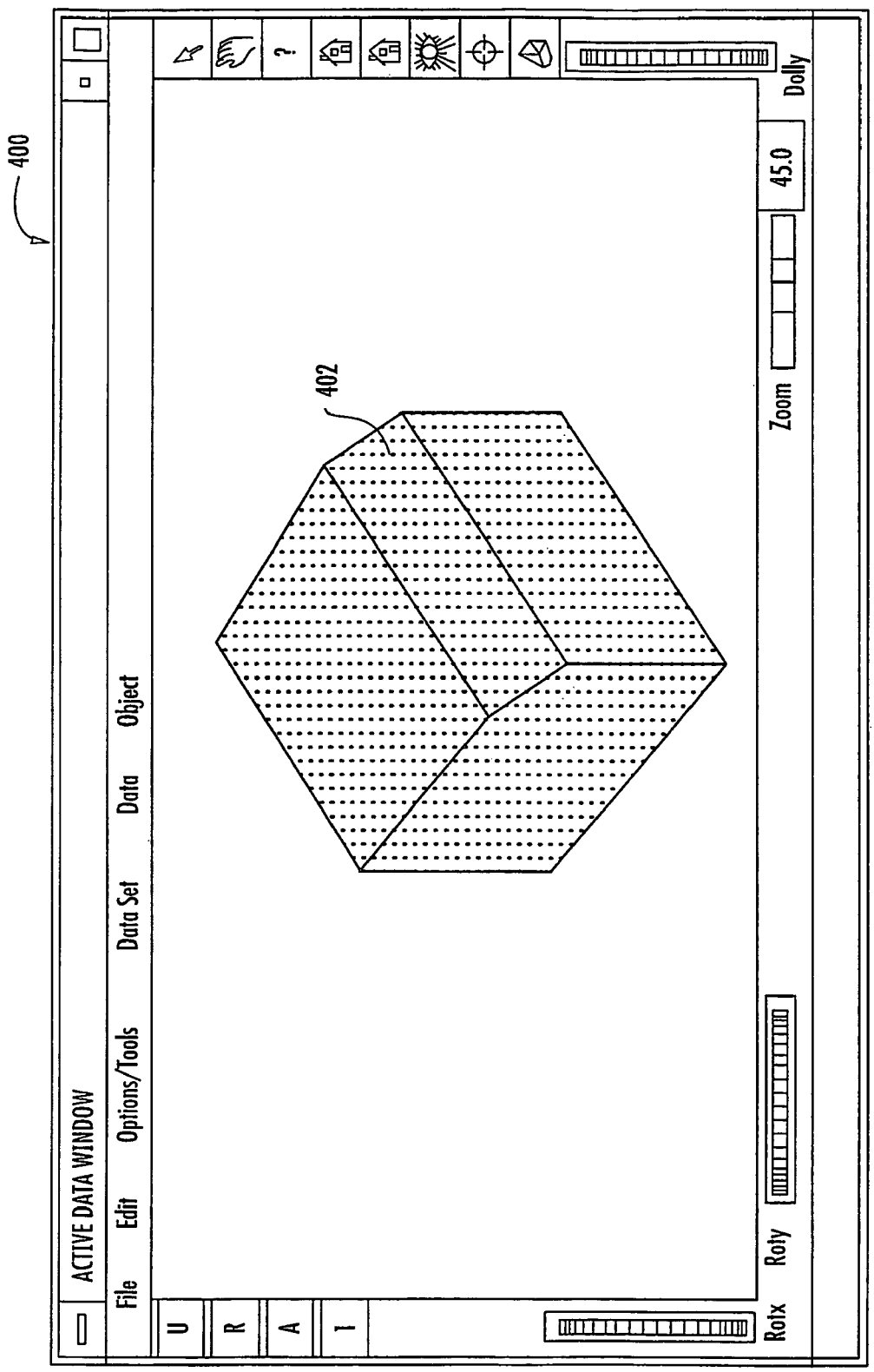
FIG. 4 shows a view window according to the preferred embodiments.

FIG. 4 illustrates how the object 300 would look in a view window 400 of the display device 1110 of the computer 1105 (shown in 1) after having been scanned. As shown, the object 300 is represented by a plurality of points 402, each representing a point on the object 300 that was impinged by the laser and returned to the laser scanner. The scanner, such as the scanner shown schematically in FIG. 11 and discussed in detail in U.S. Pat. No. 6,734,849, assigns the point three-dimensional coordinates based on the emission angle of the laser and the distance the beam travels. After collecting hundreds or thousands of such points, a sufficient number of points will have been collected so that the object is recognizable when the points are displayed in the viewer. The point cloud can be rotated or moved in the display using input devices, such as a keyboard 1120 and mouse 1130, shown in FIG. 11. The lines depicting edges (i.e., the meeting of planar surfaces) are shown in FIG. 4 for clarity. These lines may not necessarily appear in the display of the computer.

In this example, the image of the object 300 includes five discrete sections because of the five planar surfaces making up the object 300 that were visible to the scanner. So, all of the points representing the top surface will line up in a plane, as will all of the points representing the other surfaces. (Naturally, some of the points will vary from a strict geometric plane because of measurement or estimation errors.) In other words, subject to estimation errors resulting from floating-point computing errors and laser-scanner measurement errors, among other possible sources of measurement error, the normal vector for each point representing surface 302 of the object 300 will be parallel to normal vector N1 of the surface 302. The respective, other surfaces 304, 306, 308, 310 of the object 300 are represented by points each of which has a normal vector parallel to normal vectors N2, N3, N4 and N5, respectively.

The computer controls the display to give a user the option to adjust the point-cloud image of the object 300 so that certain points are more or less transparent according to a predetermined function, which is preferably a power function. By selecting this option, points with normal vectors that are parallel or antiparallel to the line of sight will be transparent on the display. Other points will be displayed with an opacity that increases with their angle from the line of sight.

Alternatively, rather than controlling the display, the computer can calculate the transparency values for points and use those values as inputs for some other calculation, such as in preparation for feature extraction. In other words, the same calculations that adjust the display to render the point-cloud scene to be more easily interpreted by a human user could also be used to help a computer automatically identify certain objects of interest.

Figure 5:
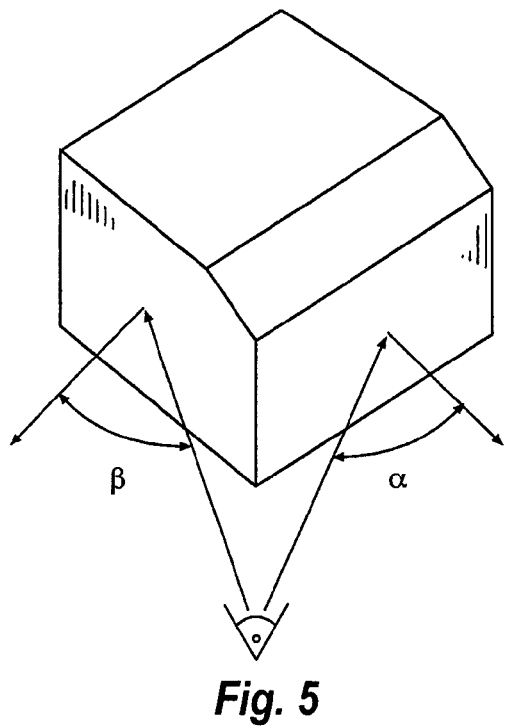
FIG. 5 and FIG. 6 illustrate two methods of determining the angle of a normal vector with respect to a line of sight in accordance with the preferred embodiments of the invention.
Figure 6:
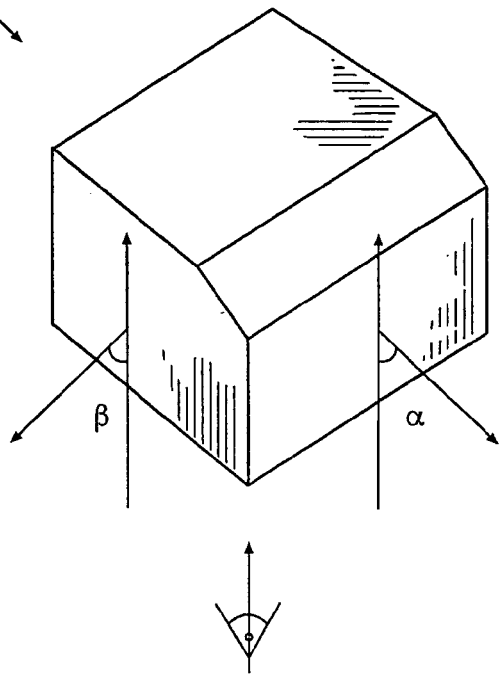

The computer preferably determines the angle between the normal vector of a point in a point cloud and the line of sight in one of two primary ways. FIG. 5 and FIG. 6 illustrate the two methods. In each figure, a sample point cloud consists of a plurality of points that compose a representation of the object 300 of FIG. 3. For simplicity of illustration, the representation of the object 300 is depicted by its edges and the points are omitted.

In FIG. 5 the line of sight is the line between the perspective point (also called the view point) and the point of interest in the point cloud. (The concept of a perspective point and its application to computer graphics is well known.) The angle of the normal vector of a point is the angle between the line of sight to the point and the normal of that point in the plane in which both lie. In other words, the normal vector and the line of sight define a plane, and the angle between them is measured in that plane. (The normal vector and the line of sight will not define a plane when they are parallel or antiparallel, but in that case the angle between them is known.) The normal angles of two points are shown in FIG. 5 as angles $\alpha$ and $\beta$.

In FIG. 6, the line of sight is perpendicular to and extends into the image plane, which is the plane of the display screen. In a manner that is well known in computer graphics, the software keeps track of a perspective point and draws the line of sight through the perspective point perpendicular to the image plane. However, unlike in FIG. 5, in FIG. 6 the line of sight is the same for all points in the point cloud. The angle of the normal vector is the angle between the normal and the line of sight in the plane in which both lie. In other words, the normal vector and the line of sight define a plane, and the angle between them is measured in that plane. (As previously noted, the normal vector and the line of sight will not define a plane when they are parallel or antiparallel, but in that case the angle between them is known.) The normal angles of two points are shown in FIG. 6 as angles $\alpha$ and $\beta$.

Other means for defining the line of sight are possible. For example, a user could select, in sequence, at least three non-collinear points to define a plane and a fourth noncoplanar point that sets the direction and position of the line of sight, which is perpendicular to the defined plane. Alternatively, the user can manually draw a line of sight in the view window 400 (which is shown in FIG. 4) with an input device, such as a mouse or keyboard.

Regardless of the method by which the line of sight is determined, points near or behind the perspective center are preferably not drawn on the display of the computer. Therefore, such points are excluded from the calculation of the angle between the line of sight and the estimated normal vector for each such point. One reason these points are excluded is to prevent calculation problems when a point's location coincides with the perspective point.

As previously mentioned, the algorithm adjusts the appearance of the points making up a point-cloud image of an object based on the line of sight. Preferably, points having normal vectors perpendicular to the line of sight are assigned high opacity, while points having normal vectors parallel to the line of sight are assigned low or zero opacity (i.e., are transparent or nearly so). The remaining points will be assigned a transparency that corresponds to the predetermined function of the angle between the point's normal vector and the chosen plane.

One of ordinary skill will appreciate that a user can customize the way in which the points change appearance based on the line of sight. For example, the user can choose to reverse the way points are displayed such that points having normal vectors parallel to the line of sight are assigned high opacity. In addition, rather than changing transparency, the points can change color or point size.

A concrete example will help to illustrate the first preferred embodiment. Suppose a user wishes to display the front of the point-cloud image of the object 300 in the manner of a mechanical drawing. (A mechanical drawing shows the front, back, sides, top and bottom faces of an object without perspective, where each of the adjacent faces are perpendicular to its neighbors.) Among other things, a user may wish to view the point-cloud representation of the object 300 in the manner of a mechanical drawing in order to obtain correct, paper mechanical drawings or to verify features of the object 300.

Preferably, the user first manipulates the point-cloud image of the object 300 so that the front face is in view. The user then selects the transparency-adjusting option. The algorithm proceeds to show each point with a transparency level determined according to the angle of the point's normal vector from the line of sight. The result is shown schematically in FIG. 7.

Figure 7:
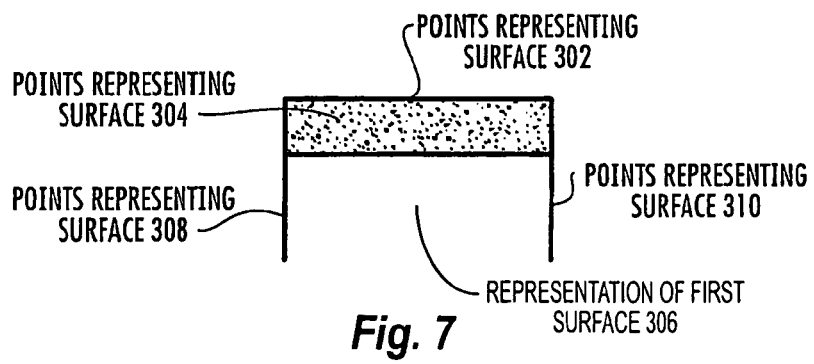
FIG. 7 shows a representation of a point cloud in which the appearance of the points has been adjusted according to a first embodiment of the invention.

In FIG. 7, the points representing the left, right and top sides are shown as lines. Each of these sets of points lie in one of three planes, which, with the planes being viewed edge-on, is the reason they appear as lines in FIG. 7. The chamfered surface 304 of the object 300 is represented in FIG. 7 as a plurality of points that are more nearly transparent than the points composing the top, left and right sides (although this relative transparency is difficult to discern in the figure). The front surface 306 is totally transparent. The transparency results from the angles of the points' normal vectors. That is, the normal vectors of the points composing the chamfered surface 304 are not parallel to the line of sight, and so have greater-than-zero transparency, but less than full transparency because the normal vectors are less than 90° from the line of sight. The top and sides, in contrast, are perpendicular to the line of sight and so are assigned full opacity, or zero transparency. As stated previously, the function for determining transparency/opacity is preferably a power function, although linear functions or step functions may be substituted for the power function.

The transparency-adjusting option may be selected in any known way such as via a radio button or check box on the viewer, or by other means not necessarily on the viewer, such as a drop-down menu or hidden menu that is revealed upon certain user action such as a right-click on a mouse.

Figure 8:
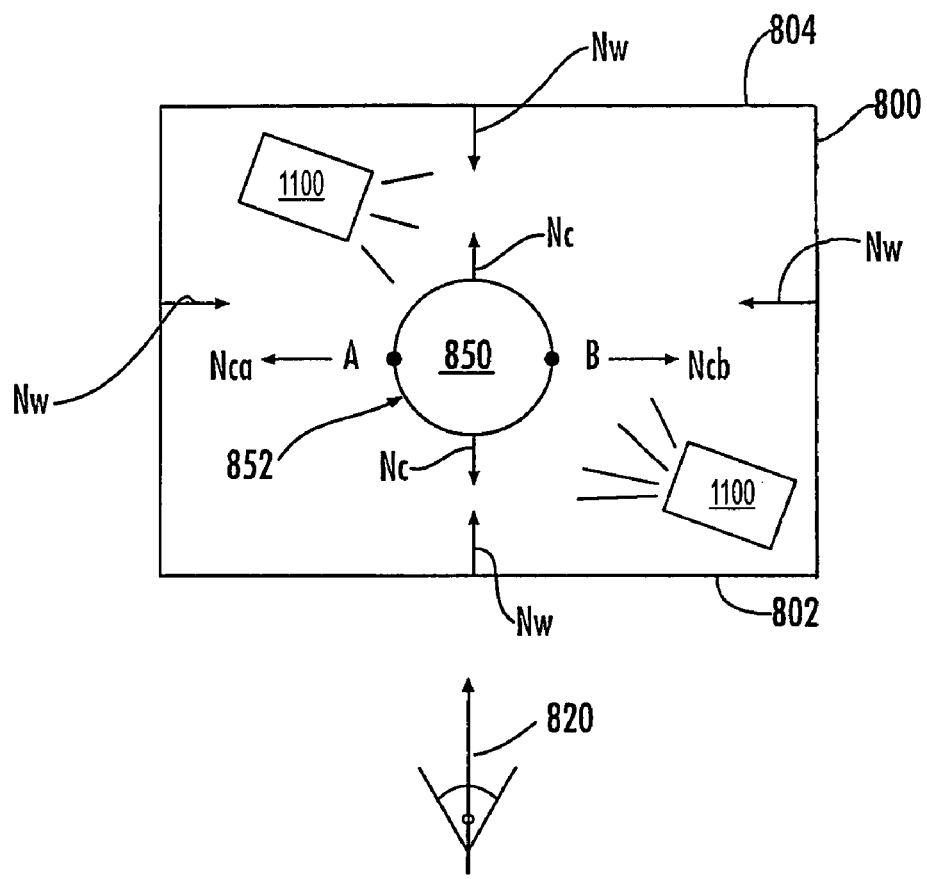
FIG. 8 illustrates an application for a second embodiment of the invention.

A second embodiment is best illustrated with reference to FIG. 8, which is a two-dimensional plan view of a three-dimensional room 800. Each of the four walls of the room 800 (i.e., a bottom wall 802, a top wall 804, and left and right walls joining them), in addition to their horizontal and vertical dimensions shown in FIG. 8, have a height dimension into and out of the paper. Each wall has a wall normal $N_w$ that is defined to face inward. (The normal faces inward because the positive normal is defined as the normal of a surface that is in the general direction of the laser scanner when a point is eventually scanned, and, as will be discussed later, the points on the walls will be scanned from inside the room 800.) In addition, a cylindrical column 850 situated (in this example) in the middle of the room 800 has an infinite number of normals all of which start on the surface of the column and extend radially outward. For simplicity, FIG. 8 shows four cylinder normals $N_c$, each one of which is antiparallel to the normal of its respective, opposite wall surface. Of these four cylinder normals, two side normals are singled out for convenience in explaining the concept of the second embodiment. $N_{cb}$ is antiparallel to the wall normal of the right wall of the room and $N_{ca}$ is antiparallel to the wall normal of the left wall of the room. The circumference of the column between the side normals defines a bottom half 852 of the column.

As an illustration of the second embodiment, suppose the room 800 has been scanned by the laser scanner 1100 from two different directions that are diametrically opposed across the room 800. (Naturally the room could be scanned from more or fewer positions depending on the circumstances. In general, more surfaces of objects will be depicted in the resultant point cloud if the room is scanned from more positions.) The two laser scans create two point clouds, which are coregistered in a well-known way. The point clouds are composed of points, each having three coordinates (e.g., x, y, z) representing their position in space. In the point cloud every point representing the walls of the room 800 will have an estimated normal parallel to one of the surface normals $N_w$ of the real surface, subject to calculation and measurement errors. Likewise, points in the point cloud that represent points near point B on the real cylindrical column 850 will have estimated normals generally in the direction of cylindrical normal $N_{cb}$, and points in the point cloud that represent points near point A on the real cylindrical column 850 will have estimated normals generally in the direction of cylindrical normal $N_{ca}$.

By selectively adjusting the transparency of certain points a user can peer inside of a room through a wall and see objects inside the room. Taking the example of the room 800 shown in FIG. 8, a user viewing the point cloud from a perspective 820 perpendicular to the bottom wall 802 of the room 800 as depicted in FIG. 8 without adjusting the transparency of any points would see primarily the bottom wall 802. (Assume that the perspective 820 shown in FIG. 8 is from some distance away from the room peering at the bottom wall 802 at about the height of the average human observer.) Internal objects such as the cylindrical column 850 would be invisible or barely discernable because the points composing the bottom wall of the room 800 occlude the cylindrical column 850.

To better see objects beyond the bottom wall, the user can adjust the transparency of points so that all points with a normal vector parallel to the line of sight are transparent or nearly transparent and the transparency of points decreases with an increase in the angle of the direction of the normal vectors of the plurality of points. Preferably, the transparency of a point decreases from a maximum transparency when the point's normal-vector angle is zero (i.e., parallel to the line of sight) to a minimum transparency when the point's normal-vector angle is 180°. Even more preferably, the transparency of points having normal-vector angles less than 90° will step up to the maximum transparency.

Applying the transparency adjustment according to the second embodiment to the example illustrated in FIG. 8, the user would see in the point cloud the points composing a portion of the cylindrical column 850. The points composing the bottom wall 802 of the room 800 will have maximum or near-maximum transparency, thus allowing a view of the cylindrical column 850.

To aid understanding, consider the transparency of various sections of the room 800 more closely. Assuming that the transparency of points having normal-vector angles less than 90° will step up to the maximum transparency (in accordance with the most preferred aspect of the second embodiment discussed above), points composing the bottom half 852 of the cylindrical column 850 (i.e., generally from point A to point B) will have a low transparency. The points closest to the bottom wall 802 will be least transparent. Transparency increases along the circumference of the bottom half 852 of the column from these points. Points composing the back of the point-cloud image of the column will have maximum or near-maximum transparency (because their normal angles are less than 90° and their transparencies are therefore automatically stepped up to the maximum). Points composing the left and right walls will have approximately the same transparency as points on or near points A and B on the column. The points composing the top wall 804 of the room will have approximately the same transparency as points representing the bottom half 852 of the column.

Incidentally, filters could be applied on top of the transparency adjustment according to the preferred embodiments, such as filters based on distance. With such filters a user could, for example, eliminate the points composing the back wall of the room 800 shown in FIG. 8. Also, in the example discussed with reference to FIG. 8, a filter is applied so that only points within a horizontal slice are considered. In the example, the horizontal slice is around eye level, and closer to the floor or closer to the ceiling are filtered out.

Figure 9:
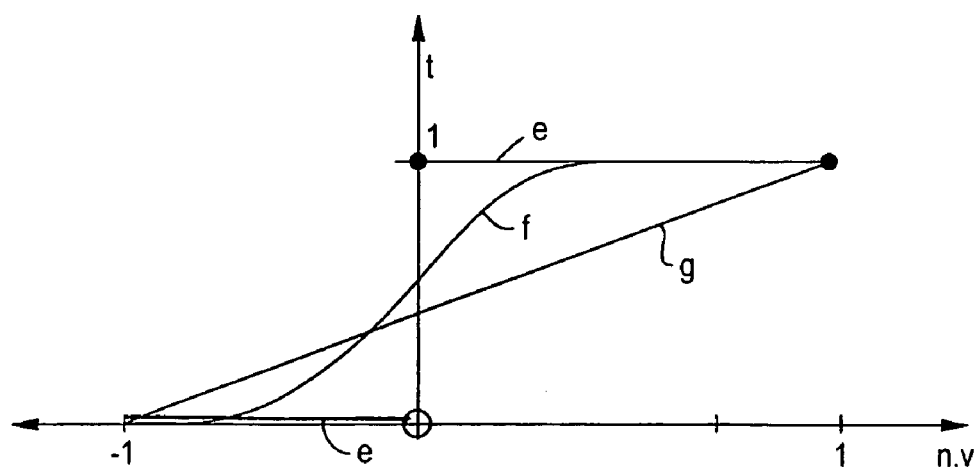
FIG. 9 is a plot of alternative predetermined functions for use in the second embodiment.

Of course, in this second embodiment, the computer can be instructed to change the appearance of points using other predetermined functions, some of which are shown in FIG. 9. For example, points could be invisible/totally transparent if the angle between the normal vector and the view direction is greater than or equal to a predetermined angle and otherwise totally opaque, expressed mathematically as:

$$x = n \cdot v,$$

where t=1.0 if x≧ϵ, and 0.0 otherwise. This function is plotted as line e in FIG. 9, where the value of ϵ is 0. (ϵ=0 is equivalent to an angle of 90° between the view angle and the normal vector.)

In addition, as with the first embodiment and Eqs. 1 and 2, other predetermined functions may be chosen based on such factors as the quality of the data, the nature of the objects represented in the point cloud, and user preference. For example, one could provide a smoother function than the step function, such as the function plotted as line f in FIG. 9. Of course, a linear function, e.g. t=x, plotted as line g, can also be substituted for a step function. Both of the functions depicted as lines f and g provide greater tolerance of error in the normal estimation.

The functions plotted in FIG. 9 are not to scale; they merely exemplify a few of the potential predetermined functions. Therefore, the plotted functions can be stretched or compressed or displaced along the x or t axis without materially affecting the invention according to the second embodiment.

Figure 10:
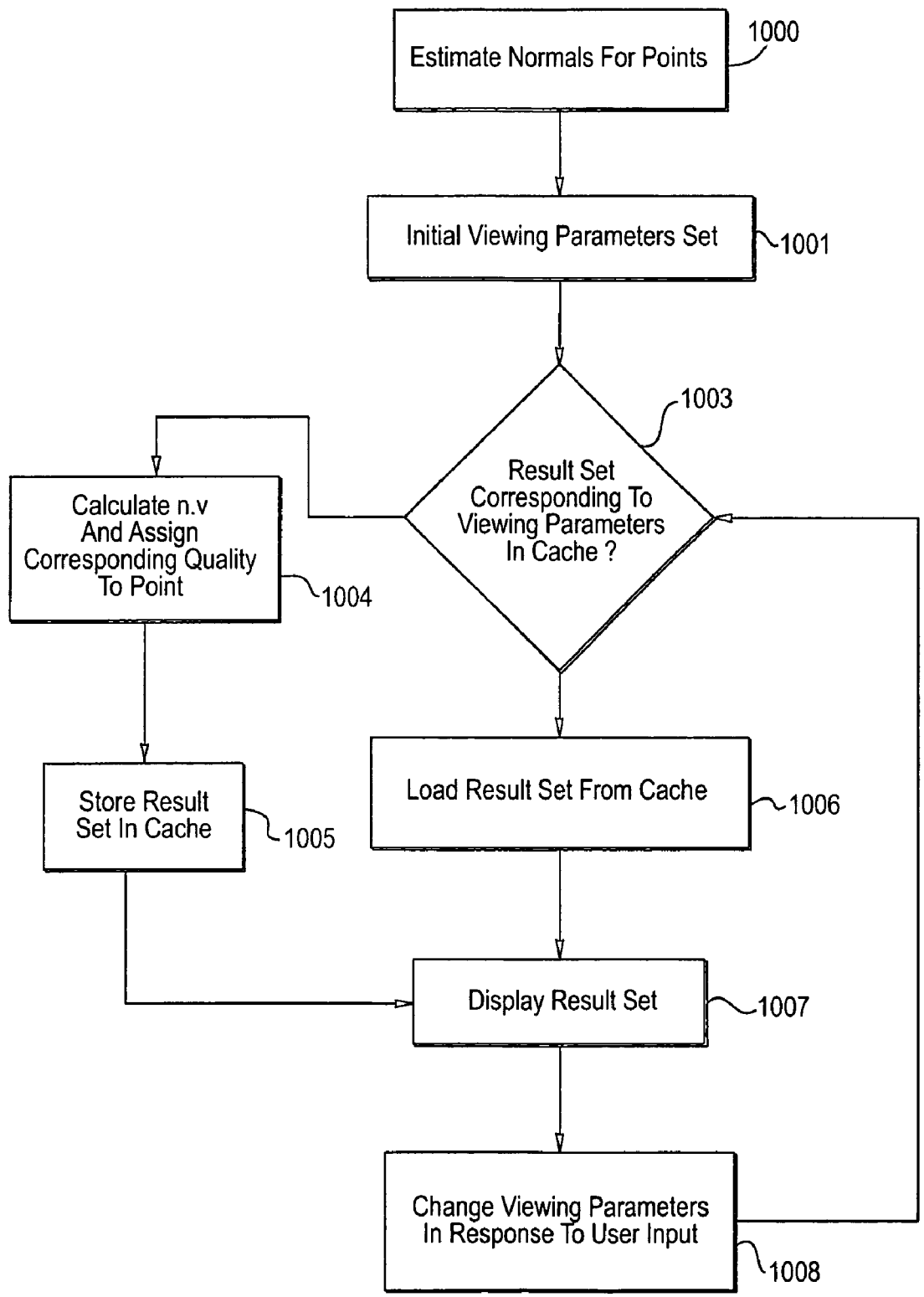
FIG. 10 shows a flow diagram to explain caching a result set calculated according to the preferred embodiments of the invention.

In addition to improving the viewability of point clouds on a computer display, the invention according to the first and second embodiments can improve the performance of the computer, primarily through caching. FIG. 10 shows the workflow related to caching. To begin with, in step 1000, the normals for points in the file are estimated. Next, in step 1001, the user sets initial viewing parameters, which include the field of view, the view direction, the view position and the quality method. The quality method refers to way of determining the quality (such as transparency) of the points. For example, a silhouette viewing mode (discussed with respect to FIG. 7) and an x-ray viewing mode (discussed with respect to FIG. 8) are both quality methods.

Next, in step 1003, the processor checks if a result set (which is described below) is currently stored in a rapid-access memory (which is typically embodied as the processor's cache). If so, the result set is loaded from the cache and displayed, as shown in steps 1006 and 1007. If not, the processor calculates n·v and assigns a corresponding quality for each point in step 1004. The result set is stored in the cache in step 1005 and displayed. When a viewing parameter (such as field of view or quality method) is changed in response to user input, in step 1008, the processor resumes the process starting with step 1003 (i.e., checking for a result set stored in cache).

The concept of a result set was raised earlier. The result set is the data that is cached. Preferably, the result set comprises the set of n·v calculations for each point in the field of view. If mapping is expensive, the result of the mapping using the n·v calculations could optionally be cached, in which case the n·v values themselves would not need to be cached. At any rate, the cache entries are preferably an association of the view parameters with either the n·v values for each point or the quality mapping for each point.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method comprising:
defining a line of sight of a point cloud displayed on a display of a computer, the point cloud being acquired by a laser range finding apparatus, the point cloud including a plurality of points that together represent a scene;
estimating normal vectors for individual points of the plurality of points;
determining the appearance on the display of the individual points of the plurality of points based on the normal vectors and the line of sight, wherein:
the determination of the appearance of the individual points includes a modification of a characteristic of the individual points, wherein the step of determining the appearance includes determining the appearance of the at least one point based on a power function:
t=|x|$^a$ where x=n·v, n is the normal vector, v is the view direction, and t is the transparency value which varies from 0.0 representing opaque to 1.0 representing totally transparent where "a" is a power value not equal to "1.0";
the characteristic of the individual points is varied between the individual points to highlight certain points of the individual points; and
displaying the individual points of the plurality of points on the display according to the determined appearance of the individual points.

2. The method according to claim 1, further comprising the steps of (i) displaying in an image plane a selected view of the scene; and (ii) calculating the angle between the normal vector of the at least one point and the line of sight.

3. The method according to claim 1, wherein the step of defining a line of sight includes selecting at least four points of the point cloud, whereby at least three points determine a plane and the fourth point determines the direction and position of the line of sight.

4. The method according to claim 1, wherein defining the line of sight includes drawing a line in the viewer with an input device.

5. The method according to claim 1, wherein a is one of the set consisting of about 0.4, and about 2.

6. The method according to claim 1, wherein the step of determining the appearance determines the appearance of the at least one point based on the dot product of the estimated normal vector and the line of sight.

7. The method according to claim 6, wherein a set of at least one calculation of the dot product is stored in rapid-access memory.

8. The method according to claim 1, further comprising applying a filter based on a horizontal or vertical slice of the data.

9. An apparatus comprising:
a laser scanner;
a computer; and
a non-transitory computer-readable medium comprising computer-executable instructions for performing the steps of: (i) determining a line of sight of a point cloud, the point cloud being acquired by the laser scanner, the point cloud including a plurality of points that together represent a scene; (ii) estimating normal vectors for individual points of the plurality of points; and (iii) determining the appearance of the individual points of the plurality of points on a display based on the normal vectors and the line of sight, wherein:
the determination of the appearance of the individual points includes a modification of a characteristic of the individual points;
the step of deterring the appearance of the individual points of the plurality of points is based on a predetermined power function:
$t=|x|^a$, where $x=n \cdot v$, n is the normal vector, v is the view direction, and t is the transparency value which varies from 0.0 representing opaque to 1.0 representing totally transparent where "a" is a power value not equal to "1.0"; and
the characteristic of the individual points is varied between the individual points to highlight certain points of the individual points.

10. The method according to claim 2, wherein the step of determining the appearance includes determining the transparency of the at least one point according to the step of calculating the angle between the normal vector and the line of sight.

11. The method according to claim 2, wherein the step of determining the appearance includes determining a color of the at least one point according to the step of calculating the angle between the normal vector and the line of sight.

12. The method according to claim 2, wherein the step of determining the appearance includes determining the point size of the at least one point according to the step of calculating the angle between the normal vector and the line of sight.

13. The method according to claim 2, wherein the step of defining the line of sight includes defining the line of sight as the line from a perspective point, which is a characteristic of the selected view of the scene, to the at least one point.

14. The method according to claim 2, wherein the step of defining the line of sight includes defining the line of sight as the line extending into the selected view of scene from the image plane.

15. A non-transitory computer-readable medium comprising computer-executable instructions for performing the steps of claim 1.

16. The method according to claim 1, further comprising providing a transparency-adjusting option thereby allowing a user to vary the transparency t.

17. The method according to claim 1, wherein t is related to point size or color.

* * * * *